(12) United States Patent
Eberhard et al.

(10) Patent No.: US 8,240,645 B2
(45) Date of Patent: Aug. 14, 2012

(54) BEARING

(75) Inventors: Günter Eberhard, Gehrden (DE);
Meinert Holst, Wunstorf (DE)

(73) Assignee: ContiTech Vibration Control GmbH, Hannover (DE)

( * ) Notice: Subject to any disclaimer, the term of this patent is extended or adjusted under 35 U.S.C. 154(b) by 1267 days.

(21) Appl. No.: 11/921,960

(22) PCT Filed: May 18, 2006

(86) PCT No.: PCT/EP2006/004710
§ 371 (c)(1),
(2), (4) Date: Dec. 11, 2007

(87) PCT Pub. No.: WO2006/136247
PCT Pub. Date: Dec. 28, 2006

(65) Prior Publication Data
US 2009/0127044 A1    May 21, 2009

(30) Foreign Application Priority Data

Jun. 21, 2005   (DE) .................... 10 2005 028 563

(51) Int. Cl.
*F16M 1/00* (2006.01)
(52) U.S. Cl. ................. 267/140.2; 267/140.12
(58) Field of Classification Search ........... 267/141.2, 267/141.3, 136, 140.11, 140.12, 140.2, 140.5, 267/141, 141.7, 292, 293; 92/26, 27, 28
See application file for complete search history.

(56) References Cited

U.S. PATENT DOCUMENTS

| | | | | |
|---|---|---|---|---|
| 4,619,188 A | * | 10/1986 | Kimura | 92/26 |
| 5,037,254 A | * | 8/1991 | Asberg | 409/233 |
| 2006/0220448 A1 | | 10/2006 | Härtel et al. | |

FOREIGN PATENT DOCUMENTS

| | | | |
|---|---|---|---|
| DE | 40 36 538 | | 5/1992 |
| DE | 100 49 140 | | 4/2002 |
| JP | 59029830 A | * | 2/1984 |
| JP | 62-56639 | | 3/1987 |

OTHER PUBLICATIONS

English-language abstract of JP 59-029830.*

* cited by examiner

*Primary Examiner* — Bradley King
*Assistant Examiner* — Nicholas J Lane
(74) *Attorney, Agent, or Firm* — Walter Ottesen

(57) ABSTRACT

The invention relates to a bearing, in particular a chassis bearing for the rear axle of a motor vehicle, with an outer bearing sleeve, an inner bearing sleeve, at least one elastomer body arranged between the outer and inner bearing sleeves and two chambers which are arranged laterally opposite each other on the outer bearing sleeve. The chambers each have an adjusting element. The adjusting elements are displaceable. When subjected to pressure, the adjusting elements are displaced inwardly against the inner bearing sleeve. The adjusting elements can be clamped in their axial position by clamping rings which can be reduced in size radially, for example by means of air pressure. The inner bearing sleeve is thereby fixed and the rigidity of the bearing increased.

13 Claims, 3 Drawing Sheets

BEARING

RELATED APPLICATIONS

This application is the national stage of PCT/EP 2006/004710, filed May 18, 2006, designating the United States and claiming priority from German patent application no. 10 2005 028 563.5, filed Jun. 21, 2005, the entire contents of which are incorporated herein by reference.

FIELD OF THE INVENTION

The invention relates to a bearing, in particular a chassis bearing for the rear axle of a motor vehicle, with an outer bearing sleeve, an inner bearing sleeve, at least one elastomer body arranged between the outer bearing sleeve and the inner bearing sleeve, and two chambers, which are arranged on the outer bearing sleeve. The main axes of the chambers form a common transverse axis with a transverse axis of the inner bearing sleeve and the chambers are arranged separately from one another and symmetrically on both sides of the longitudinal axis of the inner bearing sleeve and each has an adjusting element. The adjusting elements are arranged on the common transverse axis inside the chamber with the adjusting elements being configured to be displaceable and, when subjected to pressure, being displaced along the common transverse axis.

BACKGROUND OF THE INVENTION

Conventional bearings, such as engine bearings or chassis bearings, in particular chassis bearings for the rear axle of a motor vehicle, comprise a rubber elastomer body which is supported in the chassis. The elastomer body has a central, inner bushing in the form of an inner bearing sleeve with a pin, which is guided therein and is pivotally connected to the wheel suspension, for example. In other bearings of similar construction, the pin is mounted on the chassis and the elastomer body is connected to the wheel suspension. The elastomer body is usually enclosed by a housing in the form of a one-part or multi-part outer bearing sleeve.

With conventional bearings of this type, vibrations of the wheel suspension or the engine are damped in relation to the chassis, the damping varying as a function of the characteristics of the elastomer body.

For comfortable travel in a vehicle, a softly matched chassis bearing or a soft engine bearing is desirable. A force acting on such a ready assembled chassis bearing is damped by soft adjustment up to a specific maximum vibration amplitude. At greater vibration amplitudes, such as those which occur in the braking or acceleration of a vehicle, especially when passing through resonance, the inner and outer bearing sleeves can initially abut. In this case, a hard bearing is desirable. In order to minimize the vibration amplitude on passage of the resonance, bearings with a high bearing stiffness are, in principle, used.

DE 40 36 538 A1 and DE 100 49 140 A1 have already disclosed chassis bearings, the stiffness of which can be controlled as a function of the driving conditions. DE 40 36 538 A1 discloses an assembly bearing which can also be used for adjusting the stiffness on the sleeve bearing of a chassis. The assembly bearing has two spring elements of which one spring element is permanently operative and the other spring element can be switched in by a control device as a function of the driving conditions. The switched-in spring element is activated by an actuating element. To increase the stiffness of the assembly bearing, a diaphragm can be subjected to a pressure medium through a pressure connection thereby moving a supporting part from its original position towards one of the two operative spring elements with which it comes into contact. This means that one of the two spring elements is no longer operative so that the stiffness of the assembly bearing is increased.

DE 100 49 140 A1 describes a chassis bearing, which can be adjusted to a greater stiffness according to the running conditions of the vehicle. The greater stiffness is here achieved by the activation of a second bearing. In the switched state, the first bearing is connected in parallel to the second bearing, so that together the spring constants add up to a greater aggregate stiffness.

A disadvantage of the adjustable bearings cited is that they have a very complex and costly construction. In each case two spring systems connected in parallel or in series are necessary.

United States patent application publication 2006/0220448 A1 describes a chassis bearing of the type described in the introductory part, in which the bearing stiffness can be increased in that the adjusting elements rest against the inner bearing sleeve and are fixed by pressure acting on the rear end faces of the adjusting elements. Here, the pressure required for fixing can only be fully built up once both adjusting elements are resting against their opposing stop faces. The inner bearing sleeve is fixed relative to the outer bearing sleeve solely by the pressure acting on the end faces of the adjusting elements and by a valve, which is closed for locking and prevents an exchange of pressure medium between the individual chambers. Disadvantageous is here that the pressure must be fully developed at the instant at which the inner bearing sleeve is to be fixed and that a compressible medium, such as air, cannot be used.

SUMMARY OF THE INVENTION

The object of the invention is to configure a bearing of the aforementioned type which is easily adjustable such that the stiffness of the bearing can be increased at any time while avoiding the aforementioned disadvantages.

This object is achieved in that the two chambers each have at least one clamping ring of variable diameter, the main axis of which coincides with the common transverse axis and which is supported in at least one corresponding slot in the respective chamber and through which the adjusting elements are led with radial play. The clamping rings can be subjected to an external radial pressure and the radial play vanishes when the clamping rings are subjected to pressure so that the adjusting elements can be frictionally clamped in the clamping rings.

According to an advantageous embodiment of the invention the adjusting elements are configured as adjusting pistons.

This arrangement allows to securely clamp the adjusting elements in the particular desired position with a relatively low pressure, for example by pneumatic pressure. For this reason, only a small pressure, which displaces the adjusting elements towards the inner bearing sleeve, is needed on the end faces of the adjusting elements. The adjusting elements are fixed by the friction acting between the clamping rings and the adjusting elements. It is also advantageously possible, by controlling the radial clamping ring pressure, to damp a relative movement between the adjusting elements and the clamping rings by adjusting the pressure so that a variable sliding friction prevails between the clamping rings and the adjusting elements. An individual control of the two adjusting elements independently of one another is also possible.

According to another feature of the invention, the clamping rings are supported so that they are axially displaceable with axial play in the slots in the chambers with elastomer bodies being arranged in the annular intermediate spaces between the clamping rings and the axial inner faces of the slots with the intermediate spaces being formed by the axial play.

This arrangement affords the advantage that, when a pressure is applied to the clamping rings, the bearing does not become too stiff, since the elastomer bodies in the slots allow a relative axial movement of the adjusting pistons. The overall stiffness of the bearing then results from superimposing the stiffness of the elastomer body between the inner and outer bearing sleeves and the stiffness of the elastomer bodies in the intermediate spaces between the clamping rings and the slot faces.

In a further embodiment of the invention, the adjusting elements are securely connected to the inner bearing sleeve.

It is not necessary here to apply pressure to the adjusting elements in order for them to strike against the inner bearing sleeve. This embodiment means that the adjusting elements act in both directions of movement along their common axis, that is to say in pull and push. As a result, the radial pressure on the clamping rings needed for clamping can be reduced. Such an embodiment also prevents the adjusting elements from striking against the inner bearing sleeve when they are subjected to pressure.

The fundamental stiffness of the bearings according to the invention can advantageously be made much softer than that of conventional bearings. An improved ride comfort is consequently achieved. With bearings designed in this way the bearing stiffness can be multiplied at any time even with relatively low pressures and with compressible pressure media.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
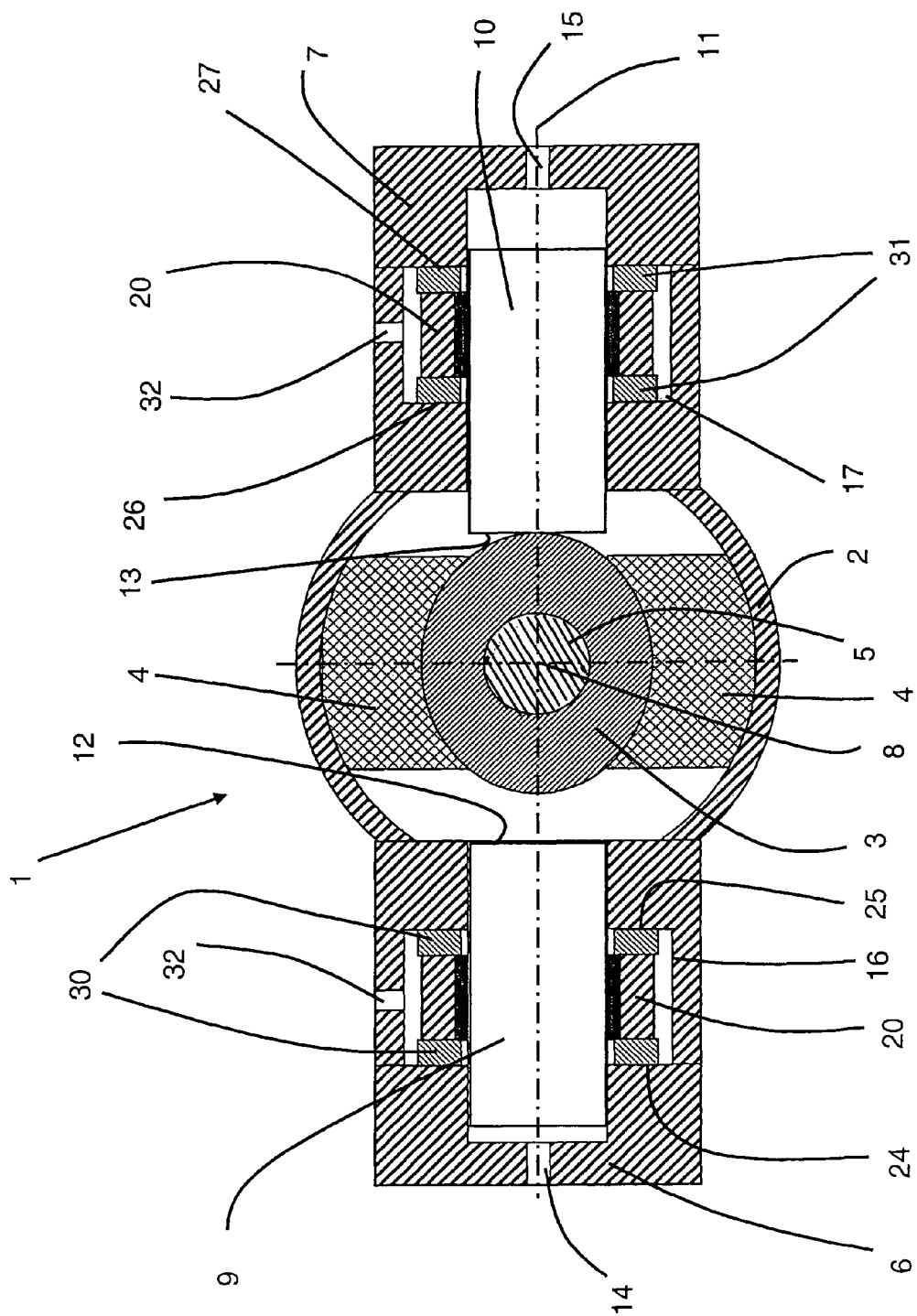
FIG. 1 shows a cross section through a bearing according to the invention with clamping rings and adjusting pistons displaceable independently of one another.

The bearing 1 represented in FIG. 1 is embodied as a chassis bearing and comprises a multi-part outer bearing sleeve 2, an inner bearing sleeve 3 and an elastomer body 4 arranged between the outer bearing sleeve 2 and the inner bearing sleeve 3. While the elastomer body 4 is connected via the outer bearing sleeve 2 to the wheel suspension (not shown here), the inner bearing sleeve 3 is fixed by a pin 5 to the chassis (not shown here).

The chassis bearing 1 further has two chambers (6, 7) which are arranged on the outer bearing sleeve 2. The chambers (6, 7) are arranged to be separate from one another and symmetrically on both ends of the longitudinal axis 8 of the inner bearing sleeve 3.

As adjusting element, each chamber (6, 7) has an adjusting piston (9, 10) which is arranged on a common transverse axis 11 of the inner bearing sleeve 3.

On their end facing the inner sleeve, the adjusting pistons (9, 10) have a stop face (12, 13), which faces can lie on the inner bearing sleeve 3, as shown on the right in FIG. 1 or can lie at a spacing from the inner bearing sleeve, as shown on the left in FIG. 1.

At the ends remote from the stop faces (12, 13) of the adjusting pistons (9, 10), the chambers (6, 7) each have a pressure connection (14, 15). The adjusting pistons (9, 10) are displaceable along the common transverse axis 11. If the interior of the chambers (6, 7) is pressurized via the pressure connections (14, 15), the adjusting pistons (9, 10) are displaced along the axis 11 until the stop faces (12, 13) lie against the inner bearing sleeve 3.

In their interior, the chambers (6, 7) each have an annular slot (16, 17) axially bounded on both sides by the respective chamber (6, 7). A clamping ring 20 of variable diameter is arranged in each of the annular slots (16, 17). The clamping ring 20 surrounds the adjusting pistons (9, 10) with a small radial clearance (not visible here).

Figure 2:
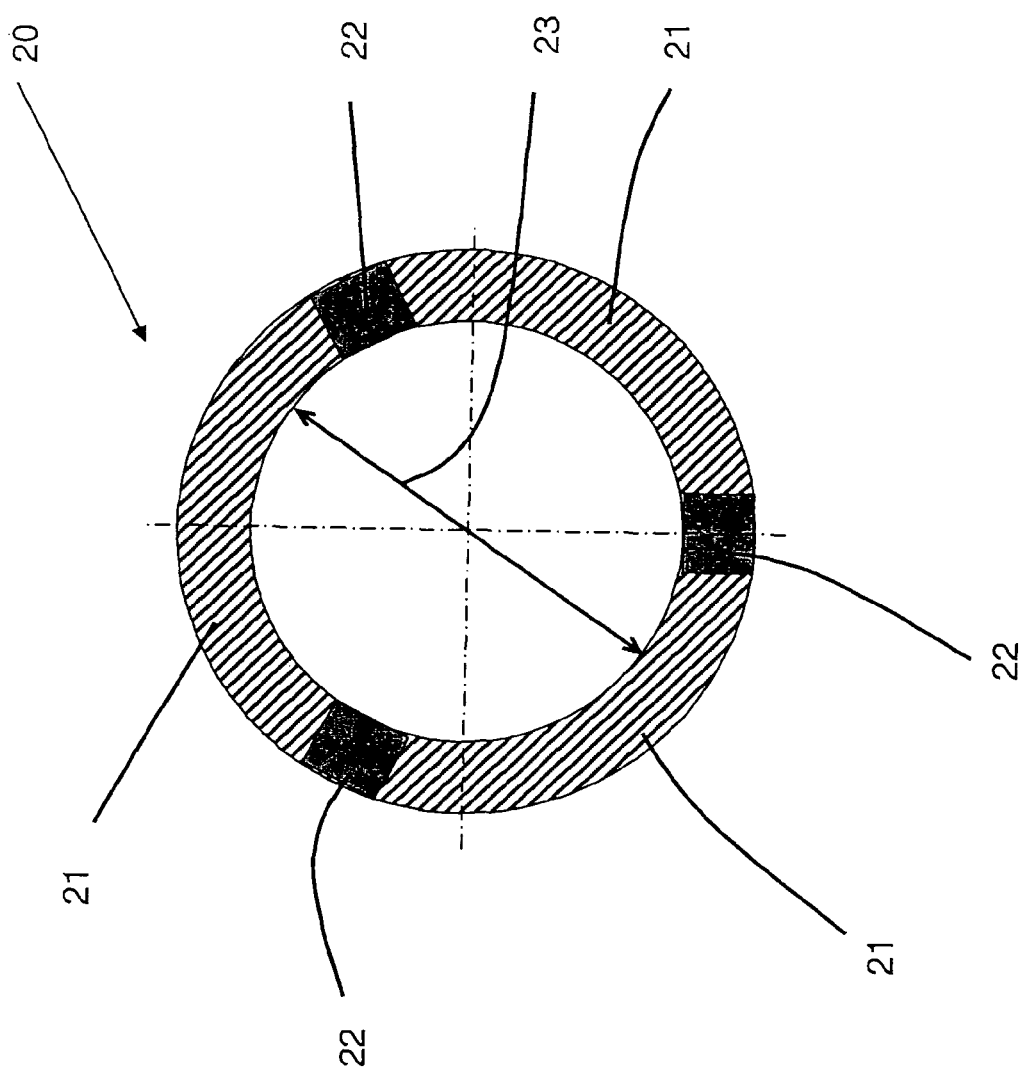
FIG. 2 shows an enlarged cross section of a clamping ring.

FIG. 2 shows an enlarged cross sectional representation of one of the clamping rings 20. The clamping ring 20 has three metal segments 21, which are joined together by elastomer bodies 22 which are vulcanized to the metal segments to form a ring. When assembled, the inside diameter 23 of the clamping ring 20 is greater than the outside diameter of an adjusting piston (9, 10).

FIG. 1 also shows that the clamping rings 20 are supported in the annular slots (16, 17) in such a way that an annular elastomer body (30, 31) is in each case arranged between the axial inner faces (24, 25, 26, 27) of the annular slots (16, 17) and the clamping rings 20. The annular slots each have a pressure connection 32 leading radially outwardly. When the annular slots (16, 17) are subjected to pressure via the pressure connections 32, the inside diameter 23 of the clamping rings 20 is reduced by tangential compression of the elastomer bodies 22. As a result, the play between the clamping rings 20 and the adjusting pistons (9, 10) vanishes. With a further increase in pressure in the annular slots (16, 17), friction occurs between the clamping rings 20 and the adjusting pistons (9, 10) which can be increased to the point of static friction. The adjusting pistons (9, 10) can therefore be fixed in any desired position by the clamping rings 20. Within the limits of elasticity of the elastomer bodies (30, 31), the elastomer bodies (30, 31) permit slight elastic axial movements of the adjusting pistons (9, 10) even in the locked state.

When pressure inside the chambers (6, 7) has caused both adjusting pistons (9, 10) to come into contact with the inner bearing sleeve 3 and the adjusting pistons (9, 10) are locked in this position by the clamping rings 20, the movement of the inner bearing sleeve 3 in the direction of the axis 11 is limited to the amount predetermined by the elastomer bodies (30, 31). The bearing stiffness is thereby considerably increased.

Figure 3:
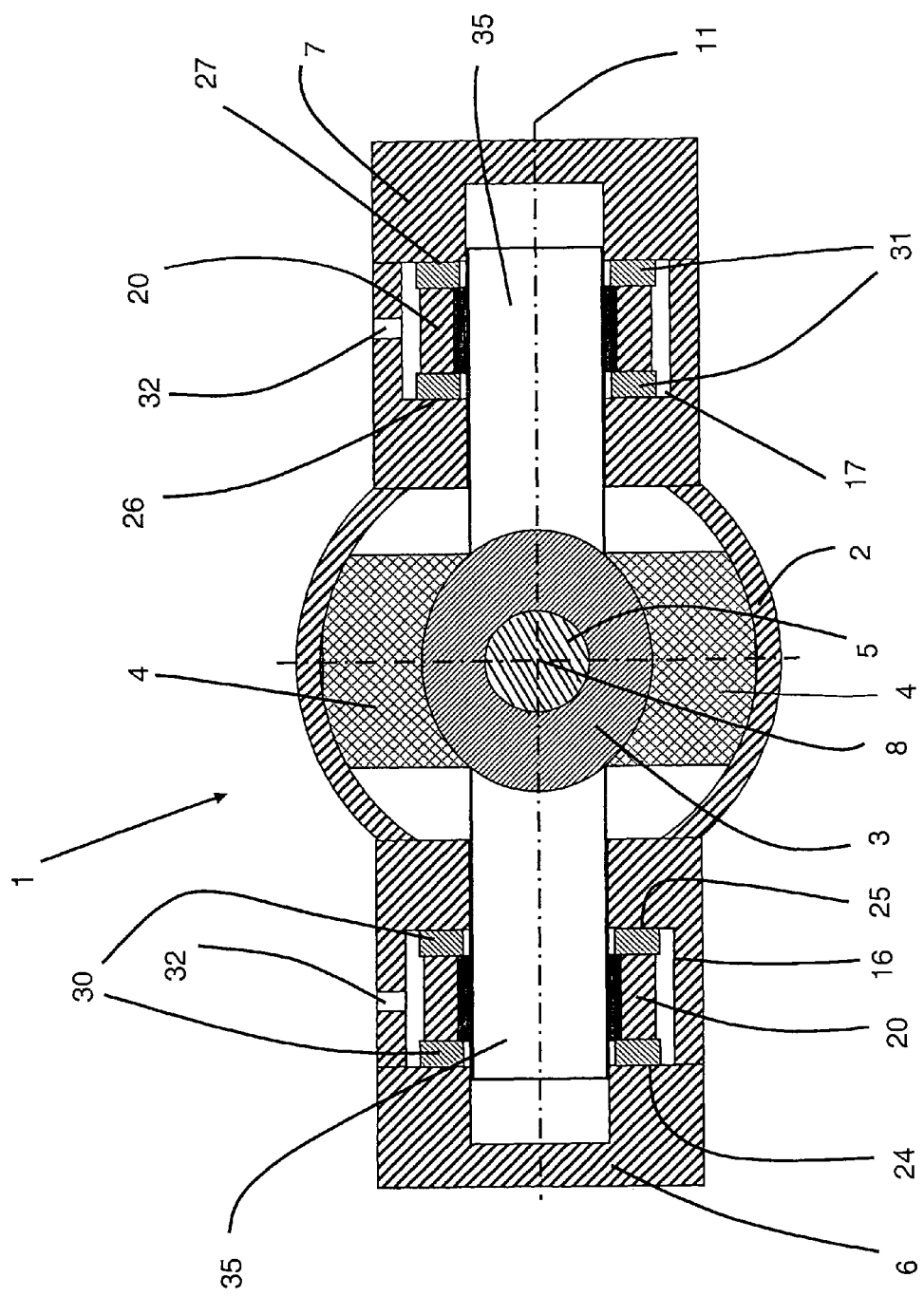
FIG. 3 shows a cross section through a bearing according to the invention with clamping rings and adjusting pistons securely connected to the inner bearing sleeve.

In FIG. 3, the inner bearing sleeve 3 has two adjusting elements, which are configured as piston-shaped adjusting arms 35 projecting laterally in the direction of the transverse axis 11. The rest of the construction corresponds to the representation in FIG. 1 and will not be explained in more detail here. The pressure connections (14, 15) are omitted. In this embodiment, the inner bearing sleeve can oscillate only along the transverse axis 11. The vibrations or oscillations of the inner bearing sleeve 3 can be damped in that the pressure in the annular slots (16, 17) is increased, thereby making the clamping rings 20 smaller and generating friction between the clamping rings 20 and the adjusting arms 35. Given a sufficiently high pressure in the annular slots (16, 17), static friction is generated between the adjusting arms 35 and the clamping rings 20. The bearing stiffness is thereby considerably increased in the same manner as in the representation in FIG. 1.

List of Reference Numerals
(Forms an Integral Part of the Description)
1 chassis bearing
2 outer bearing sleeve
3 inner bearing sleeve
4 elastomer body
5 pin
6 chamber
7 chamber
8 longitudinal axis
9 adjusting piston
10 adjusting piston
11 transverse axis
12 stop face of the adjusting piston 9
13 stop face of the adjusting piston 10
14 pressure connection
15 pressure connection
16 annular slot in the chamber 6
17 annular slot in the chamber 7
20 clamping ring
21 metal segments of the clamping rings 20
22 elastomer bodies of the clamping rings 20
23 inside diameter of the clamping rings 20
24 axial inner face of the annular slot 16
25 axial inner face of the annular slot 16
26 axial inner face of the annular slot 17
27 axial inner face of the annular slot 17
30 annularly-shaped elastomer body of the annular slot 16
31 annularly-shaped elastomer body of the annular slot 17
32 pressure connection
35 adjusting arms of the inner bearing sleeve 3

The invention claimed is:

1. A bearing for a motor vehicle, the bearing comprising:
an outer bearing sleeve;
an inner bearing sleeve defining a longitudinal axis and a transverse axis extending transversely to said longitudinal axis;
an elastomer body mounted between said bearing sleeves;
first and second chambers having respective primary axes and being mounted on said outer bearing sleeve so as to be separated from each other and so as to cause said primary axes to be coincident with said transverse axis so as to conjointly define a common axis;
said first and second chambers being disposed symmetrically on respective sides of said longitudinal axis of said inner bearing sleeve;
said first and second chambers having first and second adjusting elements, respectively, disposed therein and said adjusting elements being arranged on said common axis so as to be displaceable therealong;
first pressure application means for applying pressure to said adjusting elements to displace said adjusting elements along said common axis so as to cause said adjusting elements to come into contact engagement with said inner bearing sleeve to fix said inner bearing sleeve relative to said outer bearing sleeve in a fixed position;
said first and second chambers having first and second annular slots formed therein, respectively;
first and second clamping rings being disposed in said first and second chambers, respectively, and being supported in corresponding ones of said first and second annular slots;
each of said clamping rings having a changeable diameter and said clamping rings having respective primary axes coincident with said common axis;
said adjusting elements extending through corresponding ones of said clamping rings with radial play; and,
second pressure application means for applying pressure externally to said first and second clamping rings in a radial direction to cause said radial play to vanish and to cause said adjusting elements to be clamped friction tight in said clamping rings so as to clamp said first and second adjusting elements to hold said inner bearing sleeve in said fixed position thereby reinforcing said fix of said inner bearing sleeve relative to said outer bearing sleeve.

2. The bearing of claim 1, wherein said adjusting elements are configured as pistons.

3. A bearing for a motor vehicle, the bearing comprising:
an outer bearing sleeve;
an inner bearing sleeve defining a longitudinal axis and a transverse axis extending transversely to said longitudinal axis;
an elastomer body mounted between said bearing sleeves;
first and second chambers having respective primary axes and being mounted on said outer bearing sleeve so as to be separated from each other and so as to cause said primary axes to be coincident with said transverse axis so as to conjointly define a common axis;
said first and second chambers being disposed symmetrically on respective sides of said longitudinal axis of said inner bearing sleeve;
said first and second chambers having first and second adjusting elements, respectively, disposed therein and said adjusting elements being arranged on said common axis so as to be displaceable therealong;
first pressure application means for applying pressure to said adjusting elements to displace said adjusting elements along said common axis so as to cause said adjusting elements to come into contact engagement with said inner bearing sleeve to fix said inner bearing sleeve relative to said outer bearing sleeve in a fixed position;
said first and second chambers having first and second annular slots formed therein, respectively;
first and second clamping rings being disposed in said first and second chambers, respectively, and being supported in corresponding ones of said first and second annular slots;
each of said clamping rings having a changeable diameter and said clamping rings having respective primary axes coincident with said common axis;
said adjusting elements extending through corresponding ones of said clamping rings with radial play;
second pressure application means for applying pressure externally to said first and second clamping rings in a radial direction to cause said radial play to vanish and to cause said adjusting elements to be clamped friction tight in said clamping rings so as to clamp said first and second adjusting elements to hold said inner bearing sleeve in said fixed position thereby reinforcing said fix of said inner bearing sleeve relative to said outer bearing sleeve; and,
wherein each of said annular slots has mutually adjacent inner side wall surfaces and each of said clamping rings and said inner side wall surfaces conjointly define annular intermediate spaces at respective edges of said clamping rings; and, said bearing further comprises elastomer bodies disposed in corresponding ones of the intermediate spaces so as to permit an axial movement of the corresponding adjusting element limited by the elasticity of said elastomer bodies when pressure is applied to the clamping ring by said second pressure application means thereby relaxing the stiffness of said bearing.

4. The bearing of claim 1, wherein each of said clamping rings comprises a plurality of arcuate metal segments; and, each two mutually adjacent ones of said arcuate metal segments are interconnected by an elastomer segment vulcanized onto the adjacent metal arcuate segments.

5. A bearing for a motor vehicle, the bearing comprising:
an outer bearing sleeve;
an inner bearing sleeve defining a longitudinal axis and a transverse axis extending transversely to said longitudinal axis;
an elastomer body mounted between said bearing sleeves;
first and second chambers having respective primary axes and being mounted on said outer bearing sleeve so as to be separated from each other and so as to cause said primary axes to be coincident with said transverse axis so as to conjointly define a common axis;
said first and second chambers being disposed symmetrically on respective sides of said longitudinal axis of said inner bearing sleeve;
said first and second chambers having first and second adjusting elements, respectively, disposed therein and said adjusting elements being arranged on said common axis so as to be displaceable therealong;
said first and second adjusting elements being fixedly attached to said inner bearing sleeve so as to permit said adjusting elements to move together in both directions along said common axis in a push-pull manner;
said first and second chambers having first and second annular slots formed therein, respectively;
first and second clamping rings being disposed in said first and second chambers, respectively, and being supported in corresponding ones of said first and second annular slots;
each of said clamping rings having a changeable diameter and said clamping rings having respective primary axes coincident with said common axis;
said adjusting elements extending through corresponding ones of said clamping rings with radial play; and,
pressure application means for applying pressure externally to said first and second clamping rings in a radial direction to cause said radial play to vanish and to cause said adjusting elements to be clamped friction tight in said clamping rings so as to clamp said first and second adjusting elements in a fixed position to fix said inner bearing sleeve relative to said outer bearing sleeve thereby increasing the stiffness of said bearing.

6. The bearing of claim 5, wherein said adjusting elements are configured as pistons.

7. The bearing of claim 5, wherein each of said annular slots has mutually adjacent inner side wall surfaces and each of said clamping rings and said inner side wall surfaces conjointly define annular intermediate spaces at respective edges of said clamping rings; and, said bearing further comprises elastomer bodies disposed in corresponding ones of the intermediate spaces so as to permit an axial movement of the corresponding adjusting element along said common axis limited by the elasticity of said elastomer bodies when pressure is applied to the clamping ring corresponding thereto by said pressure application means thereby relaxing the stiffness of said bearing.

8. The bearing of claim 5, wherein each of said clamping rings comprises a plurality of arcuate metal segments; and, each two mutually adjacent ones of said arcuate metal segments are interconnected by an elastomer segment vulcanized onto the adjacent metal arcuate segments.

9. The bearing of claim 1, wherein said bearing is a chassis bearing for the rear axle of a motor vehicle.

10. The bearing of claim 3, wherein said bearing is a chassis bearing for the rear axle of a motor vehicle.

11. The bearing of claim 5, wherein said bearing is a chassis bearing for the rear axle of a motor vehicle.

12. The bearing of claim 1, wherein the pressure applied to said first and second clamping rings is a fluid pressure which defines the only force applied externally thereto.

13. A bearing for a motor vehicle, the bearing comprising:
an outer bearing sleeve;
an inner bearing sleeve defining a longitudinal axis and a transverse axis extending transversely to said longitudinal axis;
an elastomer body mounted between said bearing sleeves;
first and second chambers having respective primary axes and being mounted on said outer bearing sleeve so as to be separated from each other and so as to cause said primary axes to be coincident with said transverse axis so as to conjointly define a common axis;
said first and second chambers being disposed symmetrically on respective sides of said longitudinal axis of said inner bearing sleeve;
said first and second chambers having first and second adjusting elements, respectively, disposed therein and said adjusting elements being arranged on said common axis so as to be displaceable therealong;
first pressure application means for applying pressure to said adjusting elements to displace said adjusting elements along said common axis so as to cause said adjusting elements to come into contact engagement with said inner bearing sleeve to fix said inner bearing sleeve relative to said outer bearing sleeve in a fixed position;
said first and second chambers having first and second annular slots formed therein, respectively;
first and second clamping rings being disposed in said first and second chambers, respectively, and being supported in corresponding ones of said first and second annular slots;
each of said clamping rings having a changeable diameter and said clamping rings having respective primary axes coincident with said common axis;
said adjusting elements extending through corresponding ones of said clamping rings with radial play; and,
second pressure application means for applying pressure externally to said first and second clamping rings in a radial direction to control the pressure applied to said first and second clamping rings so as to damp a relative movement between said adjusting elements and said clamping rings by causing a variable sliding friction to prevail between said clamping rings and corresponding ones of said adjusting elements.

* * * * *